US009194629B2

(12) United States Patent
Tietsch et al.

(10) Patent No.: US 9,194,629 B2
(45) Date of Patent: Nov. 24, 2015

(54) CONDENSATION CHAMBER COOLING SYSTEM

(71) Applicant: Westinghouse Electric Germany GmbH, Mannheim (DE)

(72) Inventors: Wolfgang Tietsch, Mannheim (DE); Daniel Freis, Mannheim (DE); Felix Sassen, Mannheim (DE)

(73) Assignee: WESTINGHOUSE ELECTRIC GERMANY GMBH, Mannheim (DE)

( * ) Notice: Subject to any disclaimer, the term of this patent is extended or adjusted under 35 U.S.C. 154(b) by 619 days.

(21) Appl. No.: 13/630,789

(22) Filed: Sep. 28, 2012

(65) Prior Publication Data

US 2013/0140005 A1 Jun. 6, 2013

(30) Foreign Application Priority Data

Sep. 28, 2011 (DE) .......................... 10 2011 115 177

(51) Int. Cl.
*F28D 15/00* (2006.01)
*G21C 9/012* (2006.01)
*G21C 15/18* (2006.01)
*G21C 15/243* (2006.01)
*G21C 15/26* (2006.01)
*G21C 19/28* (2006.01)
*G21D 1/02* (2006.01)
*G21D 3/04* (2006.01)

(52) U.S. Cl.
CPC ............... *F28D 15/00* (2013.01); *G21C 9/012* (2013.01); *G21C 15/18* (2013.01); *G21C 15/243* (2013.01); *G21C 15/26* (2013.01); *G21C 19/28* (2013.01); *G21D 1/02* (2013.01); *G21D 3/04* (2013.01); *Y02E 30/31* (2013.01); *Y02E 30/32* (2013.01)

(58) Field of Classification Search
CPC ...... F28D 15/00; G21C 19/28; G21C 15/243; G21C 9/012; G21C 15/18; G21C 15/26; G21D 1/02; G21D 3/04; Y02E 30/32; Y02E 30/31
See application file for complete search history.

(56) References Cited

U.S. PATENT DOCUMENTS

| 3,397,113 | A | * | 8/1968 | Stafford | 376/283 |
| 3,431,168 | A | * | 3/1969 | Kjemtrup | 376/299 |
| 4,986,956 | A | * | 1/1991 | Garabedian | 376/283 |
| 4,998,509 | A | * | 3/1991 | Gou et al. | 122/504 |
| 5,223,208 | A | * | 6/1993 | Ishimaru | 376/273 |
| 8,731,130 | B2 | * | 5/2014 | Reyes et al. | 376/283 |
| 9,058,906 | B2 | * | 6/2015 | Schmidt et al. | 1/1 |
| 2010/0177860 | A1 | * | 7/2010 | Eoh et al. | 376/299 |

* cited by examiner

*Primary Examiner* — Marc Norman
*Assistant Examiner* — Jon T Schermerhorn
(74) *Attorney, Agent, or Firm* — Assouline & Berlowe, P.A.; Loren Donald Pearson

(57) ABSTRACT

A condensation chamber cooling system of a condensation chamber for a boiling water reactor has a heat exchanger outside the condensation chamber. An elongate cooling module is provided in the condensation chamber with an evaporation space in its upper region. The cooling module is configured such that the evaporation space is located above a maximum filling level of the condensation chamber. The cooling module includes at least one riser pipe and one downpipe that issue with their upper ends into the evaporation space and with their lower ends in the condensation chamber. A first pressure line leads from the evaporation space to the heat exchanger and, from there, a second pressure line which issues in the condensation chamber below the minimum filling level. Thus, the condensation chamber, the pressure lines, the cooling module and the heat exchanger form a passive closed cooling circuit.

10 Claims, 2 Drawing Sheets

CONDENSATION CHAMBER COOLING SYSTEM

CROSS-REFERENCE TO RELATED APPLICATION

This application claims the priority, under 35 U.S.C. §119, of German application DE 10 2011 115 177.3, filed Sep. 28, 2011; the prior application is herewith incorporated by reference in its entirety.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a condensation chamber cooling system, comprising a condensation chamber for a boiling water reactor and at least one heat exchanger arranged outside the condensation chamber.

2. Description of the Related Art

It is generally known that light water reactors are used for current generation. In this case, nuclear fuel, for example in the form of uranium fuel rods, generates heat in a reactor core in a nuclear fission and decay process. In any event, care must be taken, by a discharge of heat from the reactor core, to ensure that the latter remains within an uncritical temperature range. In light water reactors (pressurized and boiling water reactors), the reactive core is arranged inside a pressure vessel or containment. In pressurized water reactors, this forms, with a steam generator and with the supply and discharge lines, a closed system for the circulation of coolant, the actual core reactor cooling system. In a pressurized water reactor, when it is operating normally, the steam generator and the following steam turbine with its condenser serve for discharging the heat transmitted as a result of the contact of the coolant with the fuel elements. In boiling water reactors, the steam generators are dispensed with, that is to say the steam from the reactor is utilized directly for driving the steam turbines, the heat of the coolant thus being given off. A typical reactor power output amounts, for example, to 1.4 GW. However, even when a light water reactor has been run down completely, for example for maintenance purposes, it generates residual, post-decay heat for a lengthy period of time. If this is not discharged reliably, there may be an unacceptable rise in temperature of the reactor core, together with possible fuel element damage, amounting to core meltdown.

If, in a boiling water reactor, the reactor core is covered with water, sufficient cooling may be assumed. In boiling water reactors, the post-decay heat occurring after a shut-down is discharged as a result of the boiling of the water surrounding the fuel elements. By the water being evaporated, an effect of cooling the fuel elements, which corresponds to the respective evaporation energy, occurs. The steam which thus arises is blown off via safety valves into a water reservoir outside the pressure vessel or containment, into what is known as a condensation chamber, and condenses there. The pressure vessel water inventory lost by the steam being blown off into the condensation chamber is typically recirculated out of the condensation chamber back into the pressure vessel by means of active feed systems.

During condensation, that is to say during the transition of the gaseous steam into its liquid state, a respective energy output occurs which causes the water located in the condensation chamber to be heated. According to the prior art, therefore, active emergency and after-cooling systems are provided, by means of which cooling of the condensation chamber or of the water reservoir located in it and the transmission of heat to an external heat sink, for example a cooling tower, take place via corresponding heat exchangers and heat circuits.

What proves in this case to be a disadvantage is that cooling systems of this type for discharging the condensation heat introduced into the condensation chamber are of the active type, that is to say active components, such as, for example, circulating pumps for the cooling medium, require water. In spite of maximum safety measures and a redundant design of the respective cooling systems, the situation cannot be entirely ruled out where an active cooling circuit, for example after the failure of its circulating pump, is not available in the event of an accident.

SUMMARY OF THE INVENTION

Proceeding from this prior art, the object of the invention is to specify a condensation chamber cooling system that as far as possible avoids active components and, in particular, circulating pumps.

This object is achieved by means of a condensation chamber cooling system of the type initially mentioned. This is characterized in that, in the condensation chamber, an elongate cooling module is provided, having an evaporation space located in its upper region. The cooling module is configured in the condensation chamber in such a way that the evaporation space is located above a maximum filling level of a water reservoir in the condensation chamber. Furthermore, the condensation chamber cooling system according to the invention includes at least one riser pipe and one downpipe which issue with their respective upper ends into the evaporation space and with their respective lower ends in the condensation chamber below a minimum filling level of the water reservoir. A first pressure line from the evaporation space to the heat exchanger is provided and, from there, a second pressure line issues in the condensation chamber preferably below the minimum filling level, so that the condensation chamber, the pressure lines, the cooling module and the heat exchanger form a passive closed cooling circuit.

The basic idea of the invention is to provide a condensation chamber cooling system having natural circulation of the coolant or water. Such a configuration can obviate an active circulating pump and consequently reduces the probability of failure of the cooling system.

In the event of failure of the active residual heat discharge systems when there is demand, the condensation chamber water or the water reservoir heats and the pressure inside the pressure vessel or containment rises. Therefore, the pressure in the condensation chamber connected to it also rises. The liquid phase of the water in the condensation chamber and the gaseous phase located above it are in saturation equilibrium after some time; that is to say, the condensation chamber water has a saturation temperature corresponding to the containment internal pressure.

The riser pipe/downpipe is located completely inside the condensation chamber preferably in an approximately vertical arrangement and projects with its lower end into the liquid condensation chamber water. The liquid water inside the riser pipe/downpipe likewise heats up to the temperature inside the condensation chamber, which may be configured, for example, as a torus-like ring around the lower region of the containment. However, the water level inside the riser pipe/downpipe is geodetically higher than the water level or filling level of the condensation chamber.

On account of the geodetic height difference of the water level in the condensation chamber and of the water level in the riser pipe/downpipe or in the evaporation space into which the pipes issue with their respective upper ends, the static pressure in the evaporation space is correspondingly lower in the case of a height difference of, for example, 2 m. If, as explained above, the condensation chamber water is at saturation temperature, the water in the evaporation space located above the water level of the condensation chamber or in the corresponding pipe sections boils on account of the lower static pressure prevailing there.

The boiling process leads to cooling of the water located in the evaporation space, on the one hand, and to the occurrence of steam, on the other hand. The riser pipe/downpipe is configured such that water at saturation temperature is routed via the riser pipe into the evaporation space and is cooled there as a result of the boiling process to form steam. The cooled water, which then has a correspondingly higher density than the water at saturation temperature, is then supplied again via the downpipe of the water reservoir inside the condensation chamber. This density difference makes it possible to have natural circulation of the water through the cooling module, which advantageously requires no active circulating pump or the like.

In order to avoid direct intermixing of water entering the riser pipe and cooled water emerging from the downpipe, their respective lower issues are preferably arranged so as to be offset in relation to one another.

The steam arising in the evaporation space is conducted from there through the first pressure line, a steam line, to the heat exchanger which preferably includes a condenser and where the steam discharges heat to the heat exchanger by condensation. The latter then discharges the heat directly or indirectly to an external heat sink, for example to a cooling tower. However, the heat exchanger can thus have a water reservoir that absorbs the condensation heat and diverts it by means of further water circulation. The condensate arising during condensation is conducted via the second pressure line, a condensate line, from the condenser back into the condensation chamber. Ideally, the heat exchanger is disposed at a geodetic height above the condensation chamber such that the condensate flows back solely as a consequence of gravity into the condensation chamber via the condensate line, which is preferably configured with a constant gradient such that the condensate flows back solely as a consequence of gravity into the condensation chamber via the condensate line which is preferably configured with a constant downward gradient. Therefore, this coolant circuit has the advantage of not needing an active pumping element.

Thus, even at comparatively low water temperatures, for example 120° C. through 140° C., high heat flows can be implemented, because the medium to be cooled, to be precise the water located in the condensation chamber, is also used directly as coolant for the cooling circuit. This advantageously avoids the need for an otherwise necessary heat exchange process between the coolant and medium to be cooled and for the heat exchangers necessary for this purpose.

According to a preferred refinement of the condensation chamber cooling system according to the invention, the downpipe is nested into the riser pipe, so that an outer riser pipe and an inner downpipe running therein are formed. This proves especially beneficial in manufacturing terms and also enables the cooling module according to the invention to have high mechanical stability.

According to a further refinement of the condensation chamber cooling system according to the invention, its heat exchanger includes an evaporation condenser. As explained above, this makes it possible to have highly effective heat exchange on account of the condensation heat given off.

According to a further refining variant of the condensation chamber cooling system, a blow-off line issues below the minimum filling level in the condensation chamber. This line is provided for introducing steam let out via an outlet valve from an associated boiling water reactor into the water reservoir of the condensation chamber. The condensation chamber water is thereby heated correspondingly. This line is preferably branched at its end, in order thereby to allow improved penetration of the water by the steam. The condensation of the steam and therefore also the effectiveness of the condensation chamber cooling system are thereby improved.

According to a preferred variant of the condensation chamber cooling system according to the invention, a vacuum pump acting upon the cooling circuit is provided. During normal plant operation, the passively operating condensation chamber cooling system is consequently evacuated. This ensures that only liquid or gaseous water is located inside the pipe system or cooling circuit. When there is demand in a shutdown situation, the vacuum pump remains in operation in order to avoid an accumulation of non-condensable gases.

According to an especially preferred refinement of the condensation chamber cooling system according to the invention, the at least one heat exchanger is arranged geodetically above the condensation chamber. This makes it possible, in the case of a corresponding condensate line designed to fall continuously, to have purely gravity-driven recirculation of the condensate into the condensation chamber, so that there is no need for a pumping means.

Preferably, the minimum filling level of the condensation chamber corresponds at least approximately to its maximum filling level. "Approximately" same height is a height difference within a range that allows the cooling properties of the condensation chamber cooling system to be kept constant thereby during its anticipated use. An approximately identical filling level of this type is achieved by the corresponding regulated recirculation of condensation chamber water into the reactor.

An especially preferred variant of the condensation chamber cooling system according to the invention is characterized in that at least one additional active cooling circuit is provided for the discharge waste heat from the condensation chamber. An overall cooling system for the condensation chamber is thus afforded, which is diversified, that is to say is based on differently operating cooling systems. The simultaneous failure of cooling systems operating in a diversified manner is less probable than the simultaneous failure of cooling systems operating identically. Thus, advantageously, the safety of an overall cooling system of this type is further increased. Ideally, moreover, at least the active cooling system is also designed redundantly, that is to say is composed of a plurality of, if appropriate, identical and parallel-operating individual systems, the total cooling capacity of which lies below the maximum expected cooling capacity, so that, in spite of a possible failure of a system, reliable cooling is ensured. The additional use of an above-described passive system further increases operational reliability, its individual failure probability being especially low because of the passive principle.

According to the invention, in a refining variant below, a pumping system is provided for the return of water located in the condensation chamber into the associated boiling water reactor. As mentioned above, this is necessary to maintain the water inventory of the boiling water reactor and may also be considered as part of the cooling system according to the invention.

According to the invention, the heat exchanger is provided for discharging waste heat into the surroundings. This may take place, if appropriate, by interposing further cooling circuits and heat exchangers, a cooling tower constituting a preferred heat sink for the final giving off of heat into the surroundings.

Further advantageous implementation possibilities may be gathered from the further dependent claims.

DETAILED DESCRIPTION OF THE INVENTION

Figure 1:
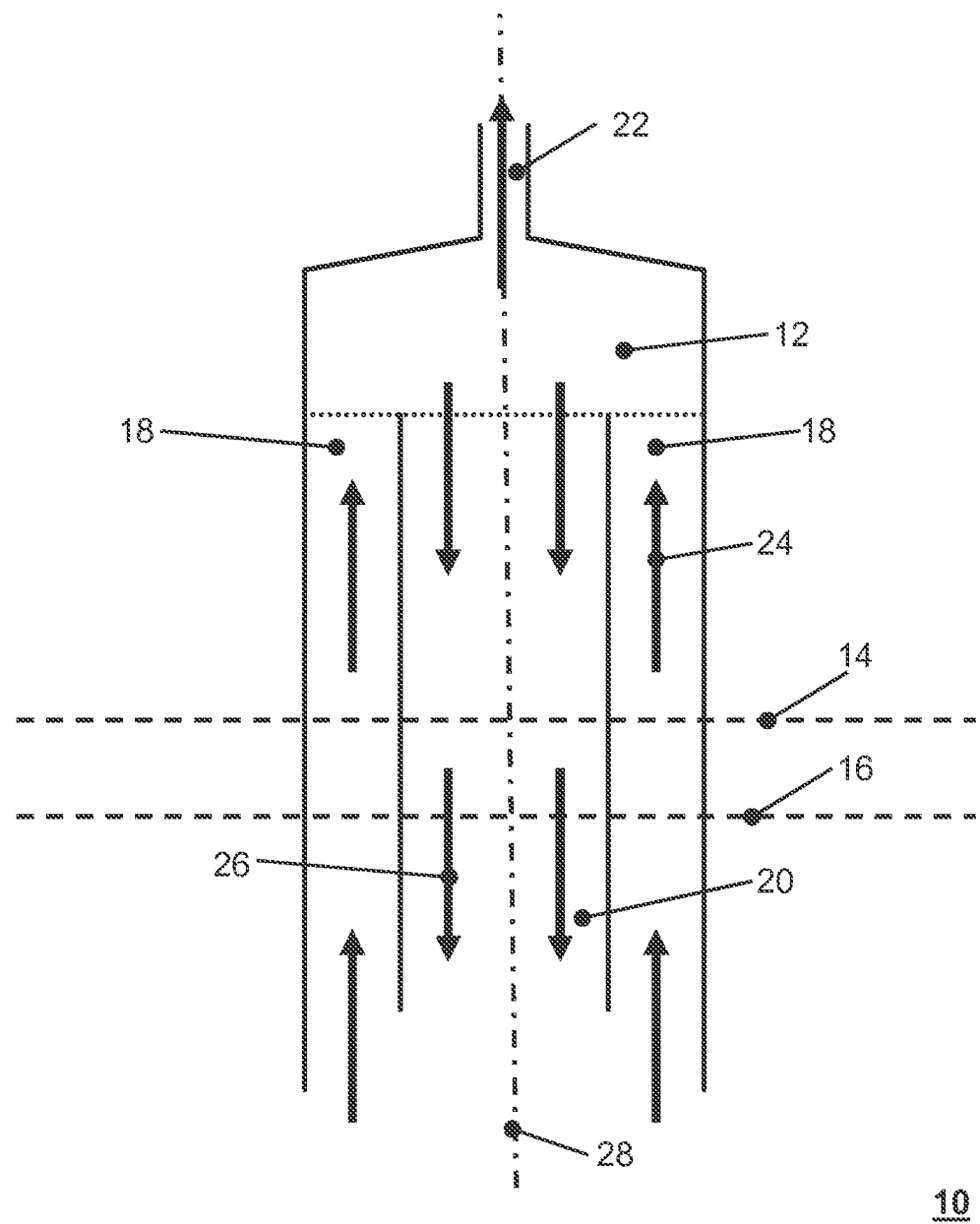
FIG. 1 is a partial diagrammatic and partial schematic sectional view of an embodiment of a cooling module according to the invention.

FIG. 1 shows a first exemplary cooling module 10 in a sectional view. In the upper region of the vertically oriented cooling module 10, an evaporation space 12 is provided in its interior. A riser pipe 18 and a downpipe 20 arranged so as to be nested in the latter issues from below into said evaporation space. In this example, the riser pipe/downpipe is indicated as being rotationally symmetrical about an axis of rotation 28, although any other further cross-sectional forms may also be envisaged, for example rectangular or even variants not nested in one another. In the upper region of the evaporation space 12, a connection 22 is arranged for a first pressure line or steam line which leads to a condenser, not shown. The cooling module 10 projects in its lower region into the water of a condenser, not shown, the maximum filling level of which is indicated by the dashed line bearing reference numeral 14 and the minimum filling level of which is indicated by the dashed line bearing reference numeral 16. This ensures that condensation chamber water can constantly flow into the riser pipe, as indicated by the arrow bearing reference numeral 24.

The water level of the water located in the evaporation space is geodetically higher than the maximum and minimum filling level in the condensation chamber when the cooling module 10 is assumed to be arranged inside the latter. It is to be assumed, furthermore, that the condensation chamber water has saturation temperature, that is to say the liquid phase and the gaseous phase, lying above it, of the water are in saturation equilibrium and that the cooling module 10 has likewise assumed this temperature. On account of the geodetically higher arrangement of the evaporation space 12, the water located therein boils under said boundary conditions.

This, on the one hand, has the effect that the boiling water is cooled, that is to say gives off heat. As a result of the cooling of the water, its density rises and it sinks back through the downpipe 20 to below the minimum filling level, as indicated by the arrow 26, that is to say it brings about a natural circulation of the water. Highly effective cooling of the condensation chamber water is consequently achieved, because the latter is used directly as coolant which gives off heat highly effectively by means of the boiling process.

On the other hand, as a result of the boiling process, steam is also generated which is then routed through the connection 22 in the upper region of the evaporation space to a condenser, not shown, where the heat is given off likewise effectively by condensation.

A suitable material for a cooling module according to the invention is, for example, higher-grade steel, and, depending on its design, a cooling module may have, for example, a height of, for example, 1 m to 2 m. This height difference is sufficient to give rise to boiling in the evaporation space 12 under saturation temperature conditions.

Figure 2:
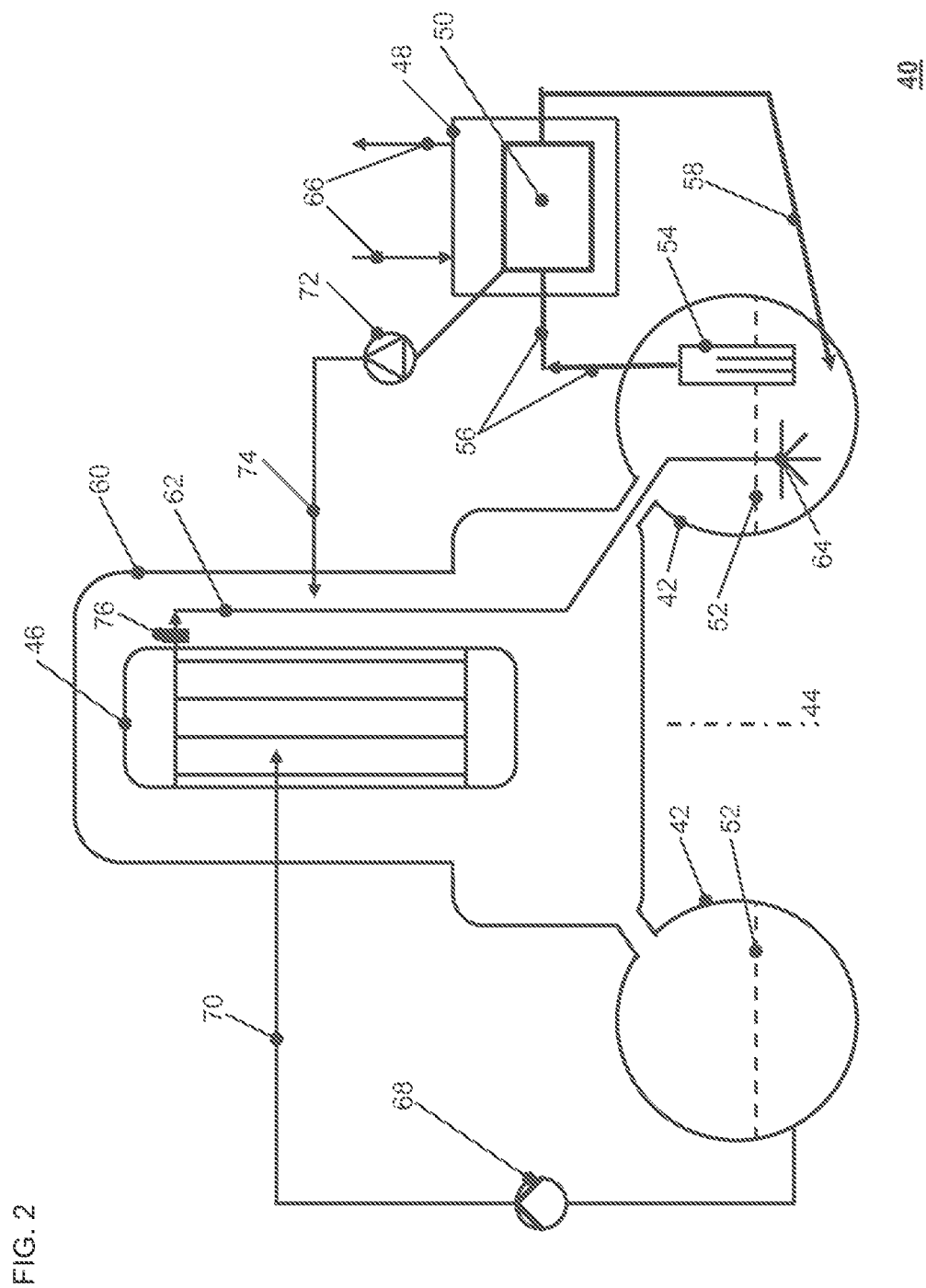
FIG. 2 is a partial diagrammatic and partial schematic view showing an embodiment of a boiling water reactor with a condensation chamber cooling system.

FIG. 2 shows an exemplary boiling water reactor with a condensation chamber cooling system in a diagrammatic view 40. A boiling water reactor 46 is arranged inside a containment or pressure vessel 60 which has, for example, a height of 10 m. A ring-like condensation chamber 42 is provided in the lower region of the pressure vessel 60 so as to be arranged toroidally around the latter about an axis of rotation 44 and is connected via corresponding pressure-resistant pipe connections to the pressure vessel 60. The condensation chamber is filled with condensation chamber water to a filling level 52.

An outlet line 62 closable by means of an outlet valve 76 leads from the boiling water reactor 46 into the condensation chamber 42 and issues there, below the filling level 52, into a distribution device 64. The latter ensures especially good penetration of the condensation chamber water by steam flowing through the outlet line 62. Steam is then introduced from the boiling water reactor 46 into the outlet line 62 if said steam has arisen, resulting in a pressure that is too high, during the reactor cooling. This steam, when it condenses in the condensation chamber 42, causes heating of the condensation chamber water located therein. Arranged vertically inside the condensation chamber 42 and so as to project into the condensation chamber water is a cooling module 54. This has an evaporator chamber and a riser pipe/downpipe, water rising through the riser pipe into the evaporator chamber, boiling there so as to give off steam, thereby being cooled and falling through the downpipe back again downward. Cooling of the condensation chamber water is thus brought about. This gives rise to a further natural cooling circuit.

The steam arising in this case is routed out of the evaporator chamber via a first pressure line 56 to a heat exchanger 48 which has, in particular, a condenser 50. Here, the steam is converted, at the same time giving off heat, into the liquid water state and is routed from the condenser 50 via a constantly falling second pressure line 58 back into the condensation chamber 42 again, this taking place solely as a consequence of gravity. The heat exchanger 48 is itself connected via corresponding supply and discharge lines directly or indirectly to a heat sink for giving off heat into the surroundings, for example a cooling tower.

A vacuum pump 72 acting upon the cooling circuit and having a return line 74 is provided for evacuating the passively operating condensation chamber cooling system during normal plant operation. This ensures that only liquid or gaseous water is located inside the pipe system or cooling circuit. When the demand is present, the vacuum pump 72 remains in operation in order to avoid an accumulation of non-condensable gases.

By means of a feed pump 68 and a water return line 70, condensation chamber water can be guided back into the boiling water reactor 46 again, so that the water inventory of the latter is maintained in spite of the outlet of steam into the condensation chamber 42.

LIST OF REFERENCE SYMBOLS

10 First exemplary cooling module
12 Evaporation space
14 Maximum filling level
16 Minimum filling level
18 Riser pipe
20 Downpipe
22 Connection for first pressure line
24 Rising water
26 Falling cooled water
28 Axis of rotation cooling module
40 Exemplary boiling water reactor with condensation chamber cooling system
42 Condensation chamber
44 Axis of rotation of condensation chamber
46 Boiling water reactor
48 Heat exchanger
50 Evaporation condenser
52 Filling level
54 Second exemplary cooling module
56 First pressure line
58 Second pressure line
60 Containment/pressure vessel for reactor (reactor containment)
62 Outlet line
64 Distributor device for outlet line
66 Supply/discharge line for heat exchanger
68 Feed pump
70 Water return line
72 Vacuum pump
74 Return line
76 Outlet valve

What is claimed is:

1. A condensation chamber cooling system, comprising: a condensation chamber for a boiling water reactor, said condensation chamber having a maximum fill line and a minimum fill line; at least one heat exchanger disposed outside said condensation chamber; an elongated cooling module being disposed in said condensation chamber, said condensation chamber having an upper region with an evaporation space; said cooing module being disposed in said condensation chamber with said evaporation space being located above said maximum filling level of said condensation chamber; at least one riser pipe and one downpipe, each of said riser pipe and said downpipe having an upper end and a lower end and, each of said respective upper ends issuing into said evaporation space, and each of said respective lower ends extending in said condensation chamber below said minimum filling level; a first pressure line connecting said evaporation space to said heat exchanger; and a second pressure line connecting said heat exchanger to said condensation chamber; said condensation chamber; said pressure lines, said cooling module, and said heat exchanger forming a passive closed cooling circuit.

2. The condensation chamber cooling system according to claim 1, wherein said downpipe is nested within said riser pipe.

3. The condensation chamber cooling system according to claim 1, wherein said heat exchanger includes an evaporation condenser.

4. The condensation chamber cooling system according to claim 1, further comprising a blow-off line issuing below said minimum filling level in said condensation chamber.

5. The condensation chamber cooling system according to claim 1, further comprising a vacuum pump acting upon said cooling circuit.

6. The condensation chamber cooling system according to claim 1, wherein said at least one heat exchanger is disposed geodetically above said condensation chamber.

7. The condensation chamber cooling system according to claim 1, wherein said minimum filling level corresponds at least approximately to said maximum filling level.

8. The condensation chamber cooling system according to claim 1, further comprising an additional active cooling circuit connected to said condensation chamber, said additional active cooling circuit being provided for discharging waste heat from said condensation chamber.

9. The condensation chamber cooling system according to claim 1, further comprising a pumping system connected to said condensation chamber, said pumping system providing return of water located in said condensation chamber into the boiling water reactor.

10. The condensation chamber cooling system according to claim 1, wherein said heat exchanger is provided for discharging waste heat into a surrounding.

* * * * *